United States Patent [19]

Flynn

[11] 4,098,009
[45] Jul. 4, 1978

[54] EASEL ASSEMBLY

[76] Inventor: William T. Flynn, 1548 Park Wood Dr., San Mateo, Calif. 94403

[21] Appl. No.: 724,409

[22] Filed: Sep. 17, 1976

[51] Int. Cl.² .............................................. G09B 11/06
[52] U.S. Cl. .......................................... 35/26; 35/60; 248/441 A
[58] Field of Search .......................... 35/26, 60, 63, 64; 248/441 R, 441 A, 442.2, 450, 454, 455, 456, 457, 462, 463, 464, 465

[56] References Cited

U.S. PATENT DOCUMENTS

| 392,565 | 11/1888 | Larew | 248/464 |
|---|---|---|---|
| 763,382 | 6/1904 | Entler | 248/456 |
| 953,456 | 3/1910 | Bowman | 248/441 A X |
| 1,989,216 | 1/1935 | Shaw | 35/60 |
| 2,485,517 | 10/1949 | Vaule | 35/65 X |
| 2,867,917 | 1/1959 | Carlton | 35/60 UX |
| 2,902,239 | 9/1959 | Janecka | 248/441 A X |

Primary Examiner—Harland S. Skogquist
Attorney, Agent, or Firm—Flehr, Hohbach, Test, Albritton & Herbert

[57] ABSTRACT

Easel assembly comprising a folding frame having front and rear legs with a drawing board mounted on each set of legs. Each drawing board includes a generally planar backboard and a transparent overlay having an erasable drawing surface, with a space between the backboard and the overlay for holding drawings and other materials in position to be traced on the overlay. One of the drawing boards is slidably and pivotally mounted on the legs for movement between raised and lowered positions for use by persons in standing and sitting positions.

7 Claims, 4 Drawing Figures

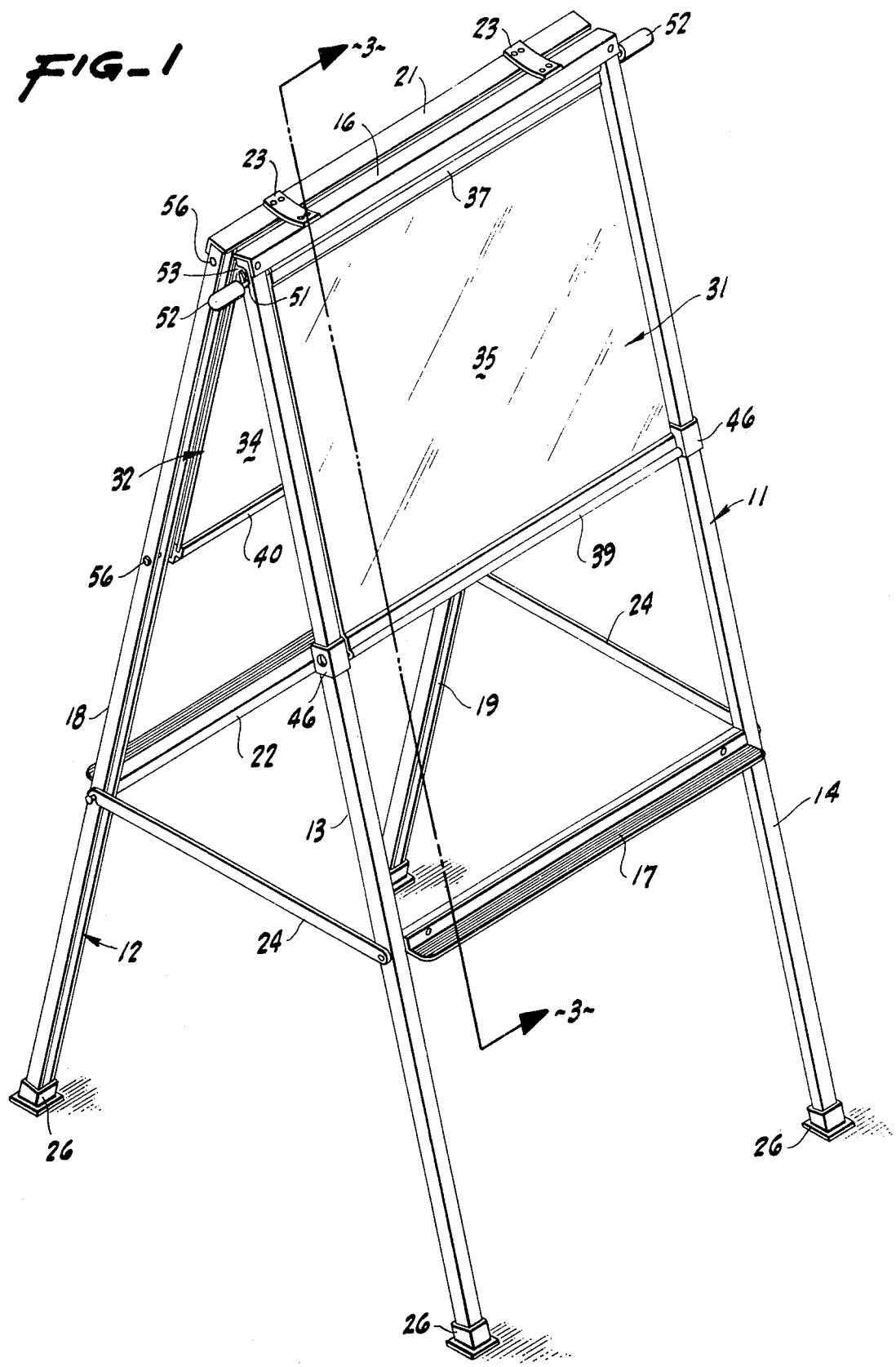

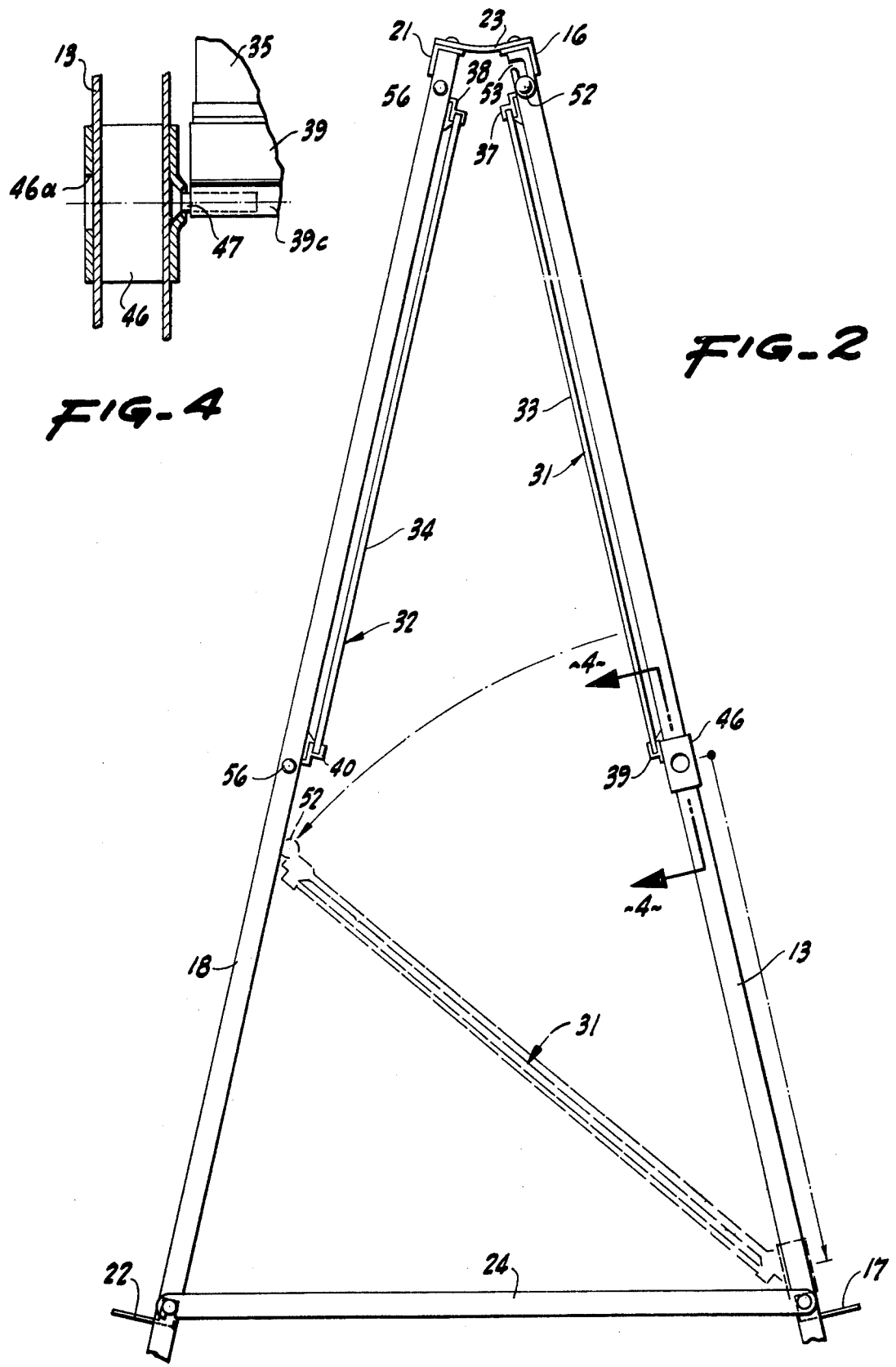

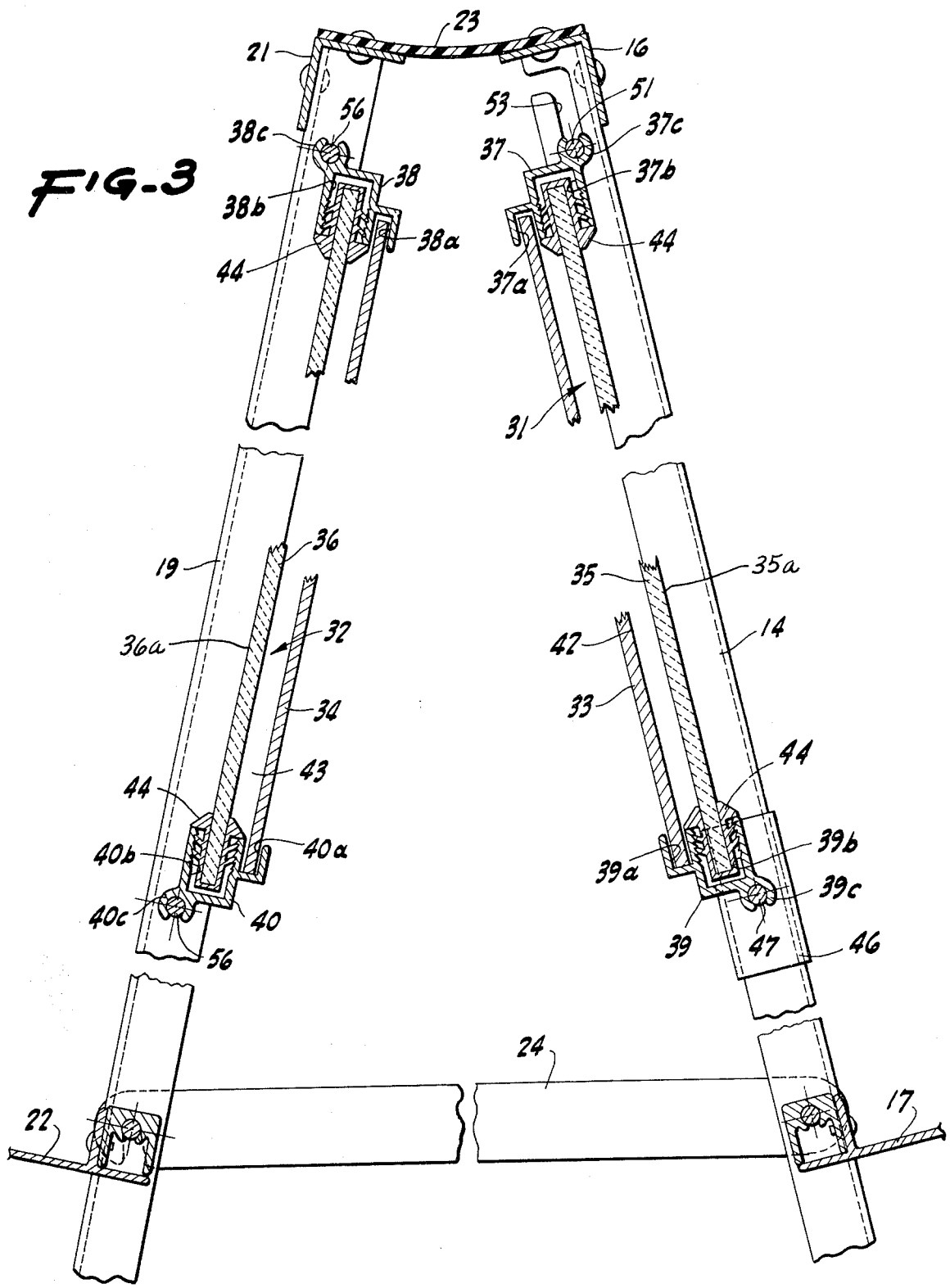

EASEL ASSEMBLY

BACKGROUND OF THE INVENTION

This invention pertains generally to drawing boards and easels and more particularly to an easel assembly which is particularly suitable for use by children at home and in the classroom.

SUMMARY AND OBJECTS OF THE INVENTION

The easel assembly comprises a folding frame having front and rear legs with a drawing board mounted on each set of legs. Each drawing board includes a generally planar backboard and a transparent overlay having an erasable drawing surface, with a space between the backboard and the overlay for holding drawings and other materials in position to be traced on the overlay. One of the drawing boards is slidably and pivotally mounted on the legs for movement between raised and lowered positions for use by persons in standing and sitting positions.

It is in general an object of the invention to provide a new and improved easel assembly.

Another object of the invention is to provide an easel assembly of the above character which is suitable for home and classroom use.

Another object of the invention is to provide an easel assembly of the above character having a drawing board which can be moved between raised and lowered positions for use by persons in standing and sitting positions.

Another object of the invention is to provide a drawing board of the above character having boards with erasable surfaces on which drawings and other materials can be traced.

Additional objects and features of the invention will be apparent from the following description in which the preferred embodiment is set forth in detail in conjunction with the accompanying drawings.

BRIEF DESCRIPTION OF THE DRAWINGS

FIG. 1 is an isometric view of one embodiment of an easel assembly incorporating the invention.

FIG. 2 is an enlarged, fragmentary side elevational view of the drawing board of FIG. 1.

FIG. 3 is an enlarged, fragmentary sectional view taken along line 3—3 of FIG. 1.

FIG. 4 is an enlarged cross-sectional view taken along line 4—4 in FIG. 2.

DESCRIPTION OF THE PREFERRED EMBODIMENT

As illustrated, the easel assembly includes a foldable frame assembly comprising a front section 11 and a rear section 12 hingedly connected together at the top. The frame sections can be closed together for transportation and storage and spread apart, as shown, when the easel is in use.

The front frame section includes a pair of generally parallel legs 13, 14, an upper cross member 16, and a lower cross member 17. The cross members are rigidly affixed to the legs, and the lower cross member forms a tray for holding chalk, crayons and other drawing materials. The rear frame section is similar to the front section and includes legs 18, 19, an upper cross member 21, and a lower cross member 22. Upper cross members 16, 21 are hingedly joined together by flexible straps 23, and braces 24 serve to lock the lower portions of the legs in a spaced relationship when the easel is in use. As illustrated, one end of each brace is pivotally mounted on one of the front legs, and the other end has a notch which engages a pin on the rear leg.

In the preferred embodiment, the legs, braces and cross members of the frame are fabricated of a rigid, lightweight material such as aluminum, and the hinge straps are fabricated of a suitable plastic. Protective feet 26, fabricated of a suitable material such as rubber or plastic, are provided at the lower ends of the legs.

Drawing boards 31, 32 are mounted on the front and rear legs of the frame, respectively. The drawing boards are of similar construction and include backboards 33, 34 transparent overlays 35, 36, upper frame members 37, 38 and lower frame members 39, 40. The backboards are fabricated of a rigid or semi-rigid material such as plastic or cardboard, and the overlays are fabricated of a transparent material such as a clear plastic or glass. The overlays have erasable drawing surfaces 35a, 36a on which drawings can be made in crayon, chalk or other suitable drawing medium. The overlays are spaced away from the backboards to form compartments 42, 43 for holding materials in position to be traced on the overlays.

The frame members of the drawing boards include channels 37a–40a in which the backboards are slidably mounted, channels 37b–40b in which the overlays are mounted, and mounting bosses 37c–40c. In the preferred embodiment, these frame members are formed by extrusion of a rigid material such as aluminum. In the embodiment illustrated, the upper and lower margins of the overlays are retained in channels 37b–40b by strips 44 of a ribbed window glazing gasket material. If desired, with plastic overlays, the gasket material can be eliminated and the frame members can be crimped directly against the overlays.

Drawing board 31 is slidably and pivotally mounted on front legs 13, 14 for movement between a raised position, as illustrated in FIGS. 1–3, and a lowered position, as illustrated in phantom lines in FIG. 2. In this regard, slides 46 are mounted on front legs 13 and 14 for up and down movement above cross member 17. The slides are pivotally connected to the frame member at the lower edge of the drawing board by screws 47 received in mounting boss 39c. In the embodiment illustrated, the slides are made of box tubing and provided with openings 46a which permit access to the mounting screws prior to installation of the slides on the legs.

Means is provided for releasably securing board 31 in the raised position. This means includes studs 51 which are mounted in boss 37c and extend therefrom. Knobs 52 are mounted on the outer ends of the studs, and notches 53 are formed toward the upper ends of legs 13, 14 for receiving the studs to retain the board in the raised position. When board 31 is in the lowered position, the studs rest against rear legs 18, 19 to hold the board at a predetermined angle relative to the front legs.

Drawing board 32 is mounted in a fixed position on rear legs 18, 19 by means of screws 56 which pass through the legs and are received in bosses 38c, 40c.

Operation and use of the easel assembly can be described briefly. For transportation and storage, the notched ends of braces 24 are disengaged from the pins on rear legs 18, 19, and the lower portions of the frame sections are closed together. In use, drawing board 31 can either be in the raised position illustrated in FIG. 1 or in the lowered position shown in phantom lines in FIG. 2. In the raised position, the board is generally most convenient for use by persons who are standing, whereas in the lowered position, it can be used by persons who are either sitting or standing. Materials to be copied can be placed in compartments 42, 43 and traced directly onto the outer surfaces of the overlays. If a more permanent copy is desired, a transparent paper can be placed on the overlay and the drawing can be made on the paper.

The invention has a number of important features and advantages. It provides a sturdy, lightweight easel assembly which is readily portable and suitable for home and classroom use. With two drawing boards, the easel can be used by more than one person at a time, and one of the boards can be used for use in either sitting or standing positions. Each board has an erasable surface, and materials to be traced are readily mounted on the boards.

It is apparent from the foregoing that a new and improved easel assembly has been provided. While only the pesently preferred embodiment has been described, as will be apparent to those familiar with the art, certain changes and modifications can be made without departing from the scope of the invention as defined by the following claims.

What is claimed is:

1. In an easel assembly: a supporting frame comprising a pair of generally parallel front legs and a rear leg diverging downwardly from the front legs, a drawing board, means slidably and pivotally mounting the lower portion of the drawing board on the front legs of the frame for movement between a raised position in which the board is positioned toward the top of the frame and generally parallel to the front legs and a lowered position in which the board is positioned below the top of the frame and inclined rearwardly with the upper portion of the board positioned between the front and rear legs, and means for releasably securing the board in the raised position.

2. The easel assembly of claim 1 wherein the upper portion of the drawing board rests against the rear leg when the board is in the lowered position.

3. The easel assembly of claim 1 wherein the means for securing the board in the raised position includes means for securing the upper portion of the board to the front leg to constrain the board against both sliding movement and pivotal movement.

4. The easel assembly of claim 1 wherein the drawing board comprises a generally planar backboard, a substantially rigid transparent overlay having an erasable drawing surface mounted on the front side of the backboard, and a compartment between the backboard and overlay for holding materials in position to be traced on the drawing surface.

5. The easel assembly of claim 1 further including a second rear leg generally parallel to the first named rear leg and a second drawing board mounted on the rear legs.

6. The easel assembly of claim 5 wherein the second drawing board is mounted in a fixed position generally parallel to the rear legs and toward the top of the frame.

7. In an easel assembly: a supporting frame comprising front and rear legs hinged together toward the top to permit the lower portions of the legs to be selectively brought together for storage or spread apart for use, a first drawing board, means slidably and pivotally mounting the first drawing board on the front legs for movement between a raised position in which the board is generally parallel to the front legs and a lowered position in which the board is inclined rearwardly and positioned between the front and rear legs, means for releasably securing the first board in the raised position, and a second drawing board mounted in a fixed position on the rear legs.

* * * * *